United States Patent [19]

Shkatov et al.

[11] 3,803,911

[45] Apr. 16, 1974

[54] DEVICE FOR MEASURING THE RATE OF FLOW OF DUST-LADEN GASES

[76] Inventors: Evgeny Filippovich Shkatov, prospekt Vernadskogo, 99, korpus 1, kv. 139, Moscow; Jury Petrovich Zhukov, Moskovsky prospekt, 82, kv. 56; Alvin Germanovich Kozlov, ul. Sovetskaya, 4, kv. 15, both of Yaroslavl, all of U.S.S.R.

[22] Filed: Sept. 18, 1972

[21] Appl. No.: 290,147

[52] U.S. Cl. ............... 73/194 R, 73/205 R, 137/824
[51] Int. Cl. ................................................. G01s 1/00
[58] Field of Search ....... 73/194 R, 205 R; 137/824, 137/842

[56] References Cited
UNITED STATES PATENTS 3,343,413   9/1967   South et al. .......................... 73/205
3,678,746   7/1972   Corey ................................... 73/194

*Primary Examiner*—Herbert Goldstein
*Attorney, Agent, or Firm*—Eric H. Waters

[57] ABSTRACT

A device for measuring the rate of flow of dust-laden gases in which the primary transducer comprises two hollow tubes. The tubes are provided with holes in their external surfaces intended to feed compressed air or an inert gas into the measured dust-laden gas flow. The holes in one tube are arranged co-axially with the holes in the other tube and are directed opposite to each other so that the flow of compressed air or inert gas from the holes of both tubes takes place in a direction at right angles to the direction of the measured dust-laden gas flow.

3 Claims, 6 Drawing Figures

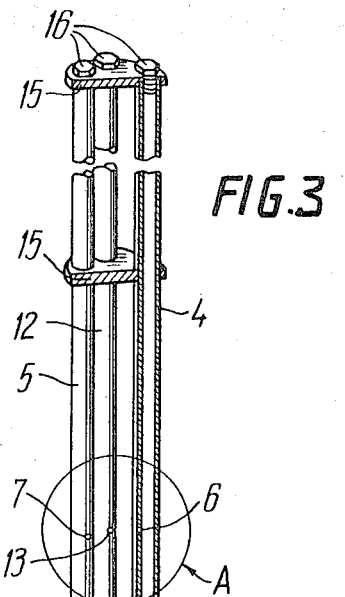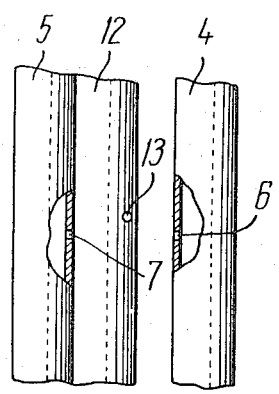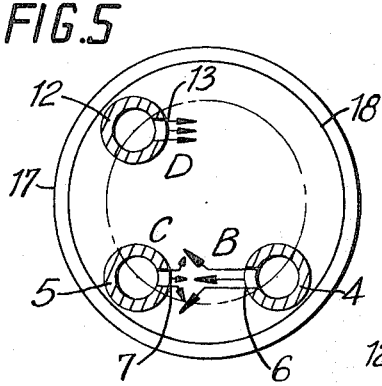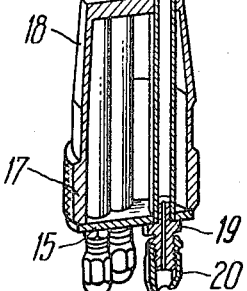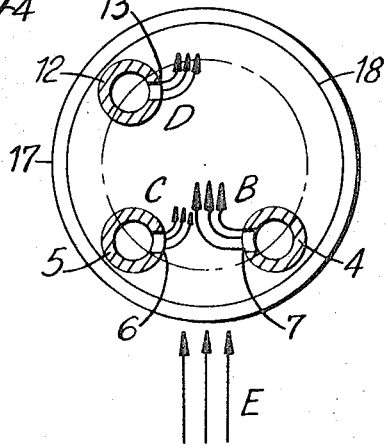

DEVICE FOR MEASURING THE RATE OF FLOW OF DUST-LADEN GASES

The present invention relates to the devices for measuring the rate of flow of gases and, more specifically, to the devices for measuring the rate of flow of dust-laden gases which find application in big ducts (between 2 and 2.5 m in diameter) of gas cleaning plant.

Known in the art is a device for measuring the rate of flow of dust-laden gases in which the measured rate of gas flow is translated into pressure difference by means of a primary transducer and the pressure difference is measured with a differential pressure gauge linked pneumatically with the primary transducer and is read from an indicator linked pneumatically with the differential pressure gauge.

In the known device, the primary transducer is a porous material offering throttling resistance to the measured flow and posing a number of operational problems, that of blocking with the dust above all. Producing a useful signal of small magnitude, the known device is practically incapable of measuring the rate of flow in big gas ducts with a diameter between 2 and 2.5 m.

The aim of the present invention is to provide a device for measuring the rate of flow of dust-laden gases fit for installation in big gas ducts, i.e., those between 2 and 2.5 m in diameter, of gas cleaning plant.

This is accomplished by the fact that in the device for measuring the rate of flow of dust-laden gases, in which the measured value of dust-laden gas flow is translated into pressure difference by means of a primary transducer and the pressure difference is measured with a differential pressure gauge pneumatically linked with the primary transducer and is read from an indicator linked pneumatically with the differential pressure gauge, said primary transducer comprises, according to the invention, two hollow tubes with openings in their external surfaces intended to feed compressed air or an inert gas into the measured flow of dust-laden gas; said openings in one tube are arranged co-axially with said openings in the other tube and directed opposite to each other so that the flow of compressed air or inert gas from the openings in both tubes takes place at right angles to the direction of measured flow of dust-laden gas.

To offset the static pressure of the measured dust-laden gas flow it is of advantage to incorporate into the device an additional hollow tube with openings in its external surface serving to feed compressed air or an inert gas into the measured dust-laden gas flow, said tube being linked pneumatically with the differential pressure gauge.

The above design features of the device for measuring the rate of flow of dust-laden gases disclosed herein will eliminate the problem of blocking the primary transducer with the dust, handle gas flows in big ducts between 2 and 2.5 m in diameter, add to the accuracy of measurements of flows with a rate of 120,000 to 200,000 nm³/hr and cut the operational cost.

The invention will be best understood from the following description of preferred embodiments when read in conjunction with the accompanying drawings, in which:

FIG. 3 shows the primary transducer of the device, according to the invention, with a tube for offsetting the static pressure of the measured gas flow (general and cut-away view);

FIG. 4 shows a close-up of encircled area A of FIG. 3 (general and cut-away view).

FIG. 5 is a cross-sectional view of the device of FIG. 2 and shows the directions of gas flow;

FIG. 6 is a cross-sectional view of the device of FIG. 5 with the addition of the applied flow of dust-laden gases.

Figure 1:
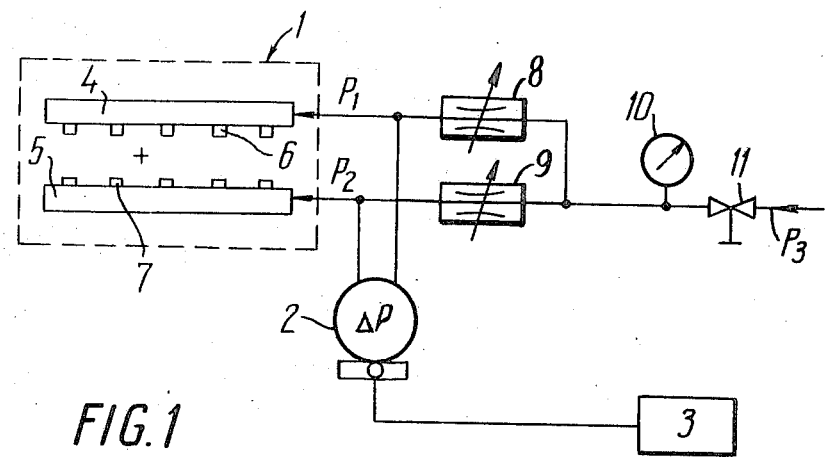
FIG. 1 shows a schematic diagram of the device for measuring the rate of flow of dust-laden gases, according to the invention.

The device for measuring the rate of flow of dust-laden gases, according to the invention, comprises a primary transducer 1 (FIG. 1), a differential pressure gauge 2 and an indicator 3, all pneumatically interlinked one with another.

The primary transducer 1 comprises two hollow tubes 4 and 5 with holes 6 and 7 (shown conventionally in the drawing) in the external surface, said holes serving to feed compressed air (or, alternatively, an inert gas) into the measured dust-laden gas flow. In the embodiment described, the direction of said flow is at right angles to the plane of drawing and is designated by an encircled cross.

The holes 6 are supply holes and the holes 7 are reception holes. The holes 6 of the tube 4 are arranged co-axially with respect to the holes 7 of the tube 5 and directed opposite to each other so that the outflow of compressed air from the holes 6 and 7 of the tubes 4 and 5 takes place at right angles to the direction of the measured dust-laden gas flow. The number of pairs of holes depends on the size of the gas ducts in which the device finds application according to the invention.

The tubes 4 and 5 are linked pneumatically with a supply of compressed air (or, alternatively, an inert gas) through the intermediary of permanent throttle valves 8 and 9, respectively (the supply is not shown in the drawing). The pressure of the compressed air admitted to the tubes 4 and 5 through the permanent throttle valves 8 and 9, respectively, is monitored by means of a pressure gauge 10 and controlled by means of a reducing valve 11.

What may be called an interthrottle chamber formed by the tube 4 and the permanent throttle valve 8 is pneumatically connected to the negative side of the differential pressure gauge 2 and the positive side of said differential pressure gauge is pneumatically connected to an interthrottle chamber formed by the tube 5 and the permanent throttle valve 9.

Figure 2:
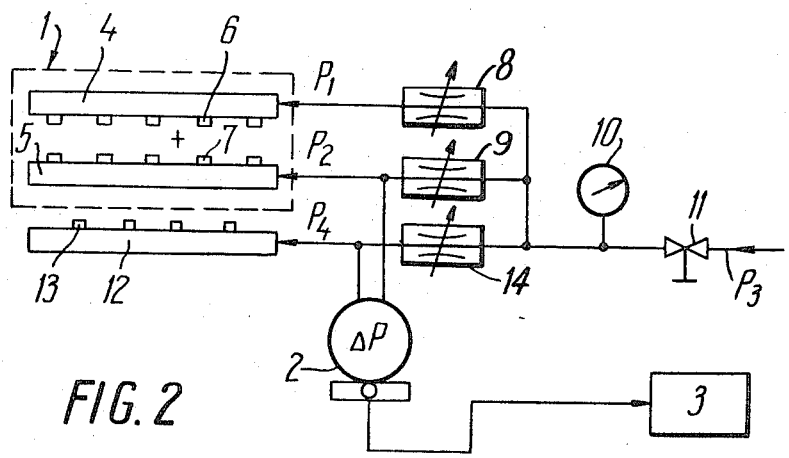
FIG. 2 shows another embodiment of the device for measuring the rate of flow of dust-laden gases in schematic form, according to the invention.

Another embodiment of the device for measuring the rate of flow of dust-laden gases shown in FIG. 2 is identical with the embodiment of the device for measuring dust-laden gas flows described above and illustrated in FIG. 1.

The only difference is that the device of FIG. 2 has an additional hollow tube 12 with holes 13 in its external surface, said holes serving to feed compressed air (or, alternatively, an inert gas) into the measured dust-laden gas flow for the purpose of offsetting the static pressure of said dust-laden gas flow. The tube 12 is pneumatically linked with a supply of compressed air through a permanent throttle valve 14. The pressure of the compressed air fed to the tube 12 via the permanent throttle valve 14 is monitored, as indicated above, by means of the pressure gauge 10 and controlled by means of the reducing valve 11.

In this case, the positive side of the differential pressure gauge 2 is pneumatically connected to the interthrottle chamber formed by the tube 12 and the permanent throttle valve 14, whereas the negative side is connected to the interthrottle chamber formed by the tube 5 and the permanent throttle valve 9.

The tubes 4, 5 and 12 (FIG. 3) are rigidly secured into a single whole by ribs 15. One end of the tubes 4, 5 and 12 is provided with blind plugs 16 and the other is accommodated in a mount 17 with a tapered cap 18 at one end and three connections 19 with connecting nuts 20 (according to the number of tubes) at the opposite end.

FIG. 4 vividly illustrates that the holes 6 and 7 in the tubes 4 and 5, respectively, are arranged co-axially and that the holes 6 and 7 are directed opposite to each other.

In FIGS. 1 and 2, the letters $P_1$, $P_2$ and $P_3$ serve to indicate the pressure of the compressed air fed into the tubes 4, 5 and the device itself, respectively; in FIG. 2 the letter $P_4$ indicates the pressure of the compressed air fed into the tube 12.

The device for measuring the rate of flow of dust-laden gases disclosed herein and shown in FIG. 1 operates in the following way.

In the primary transducer 1, the jets of compressed air issuing from the holes 6 of the tube 4 under the supply pressure $P_1$ prevent the flow of compressed air from the reception holes 7 of the tube 5 under the pressure $P_2$, due to the fact that valve 8 has a smaller hydraulic resistance than valve 9, and, consequently, obstruct the free flow of compressed air from the interthrottle chamber formed by the tube 5 and the permanent throttle valve 9. Said jets in fact perform the function of a pneumatic damper closing the reception holes 7 of the tube 5.

The measured dust-laden gas flow is directed at right angles to the jets of compressed air issuing from the holes 6 and 7. If there is no gas flow to be measured (or the rate of flow is a constant one), the pressure in the interthrottle chamber formed by the tube 5 and the permanent throttle valve 9 builds up to its maximum (or is maintained at a certain constant level).

If there is a gas flow to be measured, said flow interacts with the jets of compressed air issuing from the openings 6 so that their initial value is changed. This brings about a change in the resistance offered to the compressed air flowing through the reception holes 7 or, in other words, opens the pneumatic damper and, consequently, reduces the pressure in the interthrottle chamber formed by the tube 5 and the permanent throttle valve 9. This pressure )or its deviation from a certain value) is the output signal of the primary transducer 1 and is applied to the positive side of the differential pressure gauge 2. The pressure in the interthrottle chamber formed by the tube 4 and the permanent throttle valve 8 is applied to the negative side of the differential pressure gauge 2.

Thus, the differential pressure gauge 2 measures the pressure difference in the interthrottle chambers as translated from the value of the rate of flow of dust-laden gas by means of the primary transducer 1.

The output signal from the differential pressure gauge 2 is fed to the indicator 3 with the scale graduated in units of the rate of flow of dust-laden gas.

The device for measuring the rate of flow of dust-laden gases shown in FIG. 2 operates on the same lines as the device for measuring the flow of dust-laden gases illustrated in FIG. 1.

The only difference is that the pressure in the interthrottle chamber formed by the tube 5 and permanent throttle valve 9 is applied to the negative side of the differential pressure gauge 2 and the pressure offsetting the static pressure of the dust-laden gas flow is applied from the interthrottle chamber formed by the tube 12 and the permanent throttle valve 14 to the positive side of said pressure gauge.

Thus, the differential pressure gauge measures the difference in pressure between the interthrottle chambers.

The device for measuring the rate of flow of dust-laden gases disclosed herein assures high reliability. It is a compact outfit capable of being adjusted for measurements over a wide range. Good economy and simplicity of manufacture are other advantages in addition to the fact that the device is absolutely fire and explosion-proof.

The use of the device disclosed herein in big ducts (between 2 and 2.5 m in diameter) of gas cleaning plant provides for automation of the plant, cuts labour and metal requirements, improves the quality of cleaning combined with more effective utilization of the sorbent.

What is claimed is:

1. A device for measuring the flow rate of dust-laden gases comprising, in combination, a transducer for generating a pressure difference corresponding to the flow rate of said dust-laden gases; a first hollow tube in said transducer and having a first set of holes through the wall of said first tube; a source of compressed gas communicating with said first tube for passing compressed gas through said first holes and into said dust-laden gases, said compressed gas comprising substantially air and an inert gas; a second hollow tube in said transducer and communicating with said source of compressed gas, said second tube having a second set of holes through the wall of said second tube for passing said compressed gas into said dust-laden gases, said first holes being arranged coaxially with said second holes and facing said second holes; means for directing said dust-laden gases through said transducer along a predetermined direction, said compressed gas flowing out of said first and second holes in a direction normal to the direction of flow of said dust-laden gases, said first and second tubes having the same hydraulic resistance; a first throttle valve connected to said first tube and defining a first interthrottle chamber between said first tube and said first throttle valve; a second throttle valve connected to said second tube and defining a second inter-throttle chamber between said second tube and said second throttle valve, said second throttle valve having substantially higher hydraulic resistance than said first throttle valve, the compressed gas flowing out of said first holes being deflected by said dust-laden gases for altering the resistance at the outlets of said second holes of said second tube to change the pressure difference between said first and second inter-throttle chambers, the pressure difference between said interthrottle chambers being substantially proportional to the flow rate of said dust-laden gases; a differential pressure gage connected to said transducer and measuring said pressure difference; recording means connected to said gage to record said pressure difference; and means connected to said source of compressed gas for regulating and measuring the pressure of the gas from said source.

2. A device for measuring the flow rate of dust-laden gases as claimed in claim 1, wherein said differential pressure is connected to said first and second inter-throttle chambers.

3. A device for measuring the flow rate of dust-laden gases as claimed in claim 1, including an additional throttle valve connected to said means for regulating and measuring pressure from said source; an additional hollow tube connected to said additional throttle valve; an additional inter-throttle chamber formed by said additional hollow tube and said additional throttle valve, and connected to said differential pressure gage, said differential pressure gage being connected to said second inter-throttle chamber, said additional hollow tube having holes for supplying said compressed gas into said dust-laden gases to compensate for the static pressure of said dust-laden gases.

* * * * *